United States Patent Office 3,553,097
Patented Jan. 5, 1971

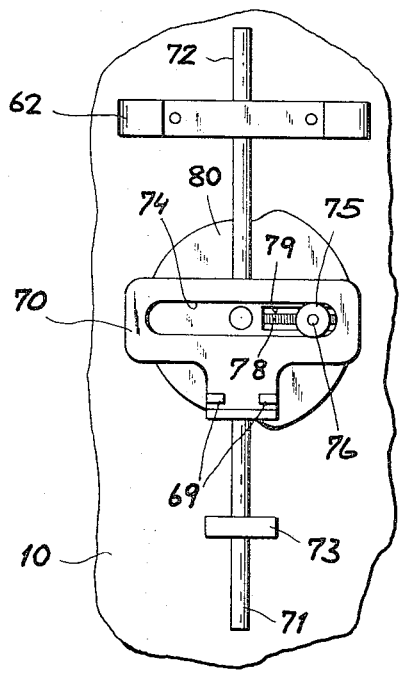
Fig.3
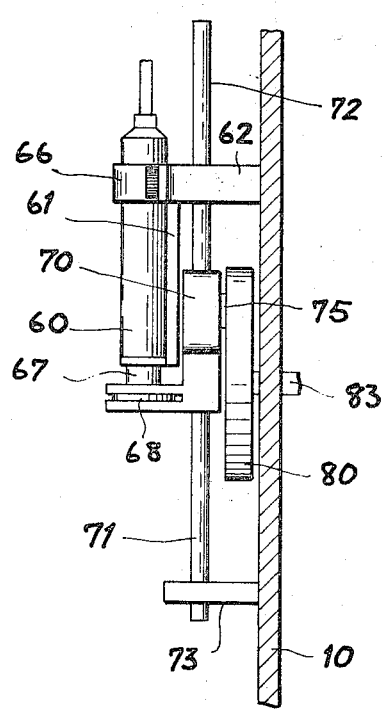
Fig.4
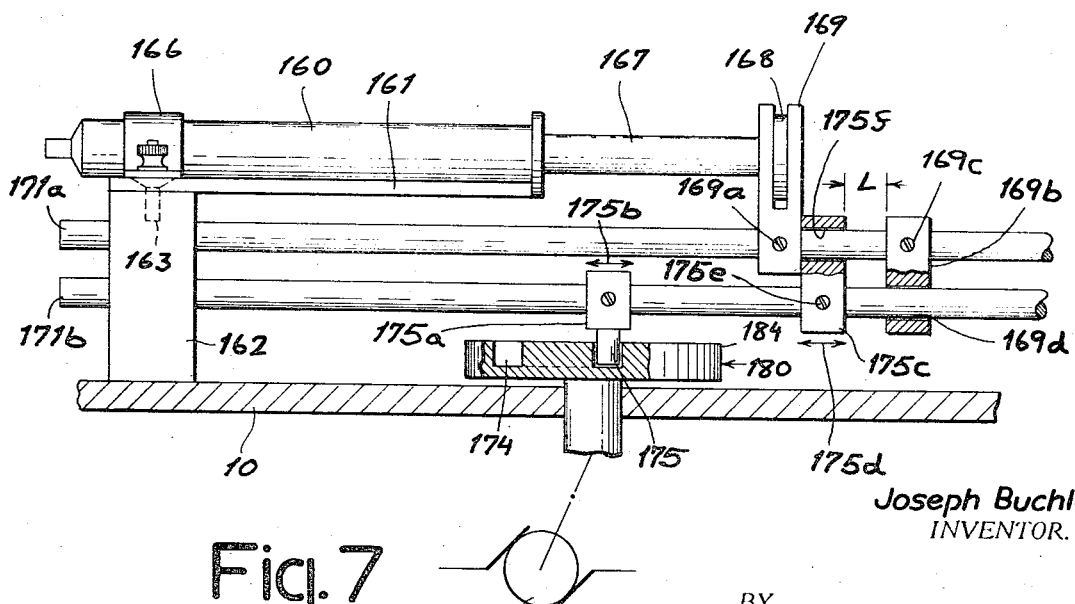
Fig.7
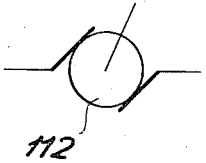
Joseph Buchler
INVENTOR.
BY
Karl F. Ross
Attorney

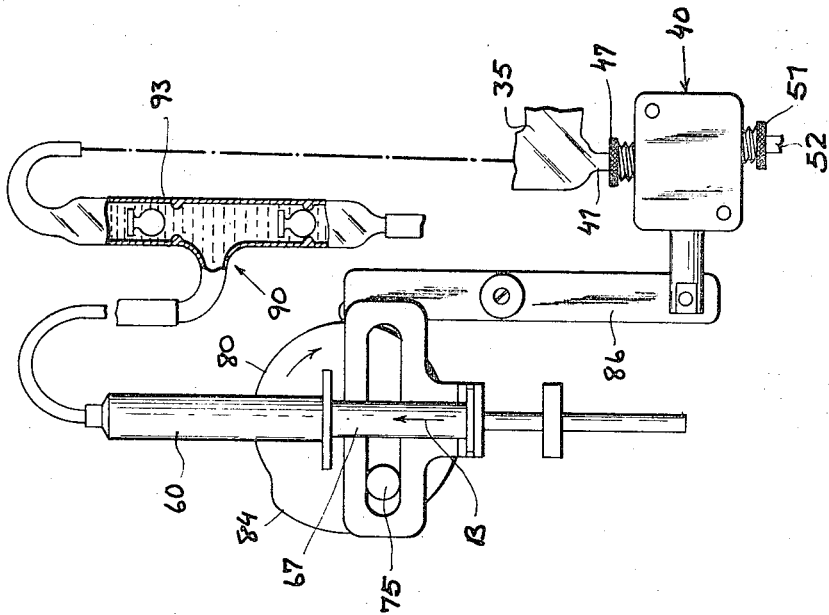
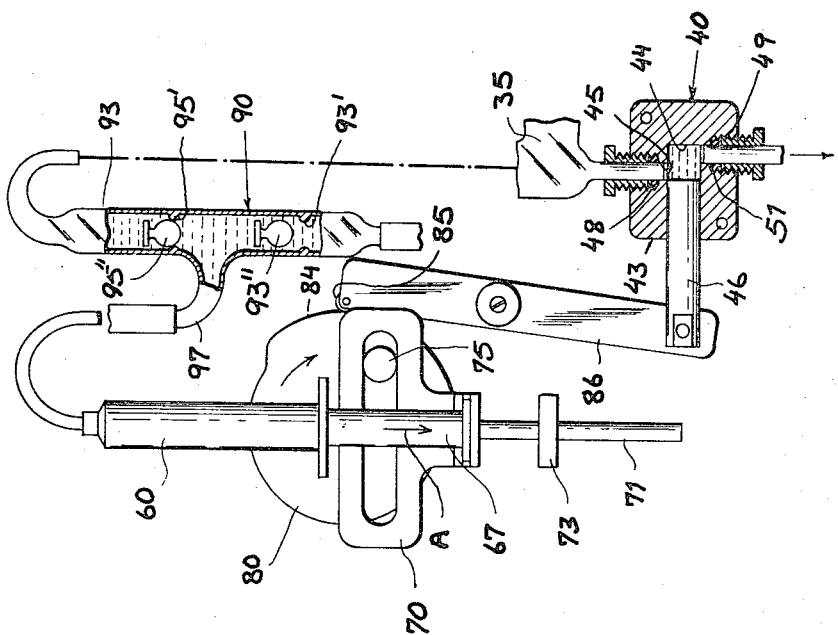

3,553,097
FRACTIONAL ELECTROPHORESIS SEPARATOR
Joseph Buchler, Fort Lee, N.J., assignor to Buchler Instrument, Inc., Fort Lee, N.J., a corporation of the United States of America
Filed Dec. 29, 1967, Ser. No. 698,373
Int. Cl. B01k 5/00
U.S. Cl. 204—299                                    12 Claims

ABSTRACT OF THE DISCLOSURE

To perform electrophoresis in a column having a gel-supported sample suspended between upper and lower buffer solutions across which an electric field is applied, with continuous circulation of the upper buffer through a reservoir, the lower buffer is periodically discharged into a fraction collector under the control of a valve mechanically operated from a rotating cam which is rigid with a crank mechanism actuating a syringe, between discharges, to supply fresh elution buffer to the bottom of the column. The valve opens during the suction stroke whereby a syringe aspirates buffer from reservoir. A mechanism arrests the syringe plunger in midstroke to facilitate adjustment of crank eccentricity and stroke length.

---

My present invention relates to an apparatus for the electrophoretic separation of biologically active organic specimens, such as proteins, nucleic acids, and enzymes, as well as other materials evidencing mobility in a unidirectional electric field and, more particularly, to a fractional electrophoresis system using a gel column.

In my earlier copending application Ser. No. 455,401, now Pat. No. 3,375,187, filed May 13, 1965 (now Pat. No. 3,575,187 issued on Mar. 26, 1968), I have described and claimed an apparatus for preparative gel electrophoresis in which a polyacrylamide gel is provided at its upper end with a buffer electrolyte in which one electrode is immersed and defines at its lower end, with respect to a rigid membrane (e.g. a microporous glass plate), an elution gap into which an eluting liquid is fed circumferentially and from which the liquid is aspirated continually through the center of the gel column. Below this membrane, a second buffer electrolyte was provided to form a bridge between the other electrode and the lower end of the gel column, preferably via a semipermeable membrane. In this system, as well as the system described by T. Jovin, A. Chrambach and M. A. Naughton in Analytical Biochemistry, vol. 9, No. 3, 1964, pp. 351–369, the elution is carried out continuously through a narrow gap between the face of the gel column and a membrane. Continued research into the improvement of preparative gel electrophoresis has shown that the temperature regulation hitherto necessary in the Jovin et al. system can be eliminated when the membrane is omitted and, in place of a narrow gap, a receptacle of relatively small volume is disposed at the lower end of the gel column; the high rate of heat development can be reduced if the electrophoresis current is intermittently terminated during an elution-solution replacement phase of the operating cycle.

Thus, according to the improved technique, an automatic program means terminates the current supply across the electrodes, discharges the solution from the receptacle beneath the gel column, introduces an identical quantity of fresh elution into the receptacle, and reapplies the electrophoresis current.

It is the principal object of the present invention to provide an improved apparatus for the general purpose last described which conveniently and simply will execute in a substantially automatic manner the replenishment and draining of the elution liquid from a gel electrophoresis device.

Another object of this invention is to provide a relatively compact and simple electrophoresis apparatus which requires minimum effort for its assembly, regulation and operation.

I have now found that electrophoresis can be carried out conveniently and effectively with the aid of a gel column when the dispensing means for precisely metering and draining identical quantities of elution liquid comprises a syringe-type pump whose plunger is operated by an eccentric cam, coupled with the plunger and defining an adjustable plunger stroke. According to this aspect of the invention, a two-way intake-discharge valve assembly is provided between the elution receptacle, a reservoir and the syringe so that, upon the advance stroke of the plunger, the elution solution is driven into the receptacle and, upon the reverse stroke, fresh elution buffer is aspirated from a reservoir into the syringe. At the outlet of the receptacle I provide a valve whose member is mechanically operable from the eccentric cam of the plunger, thereby precisely co-ordinating the discharge of the previous quantity of elutant (containing components of the specimen which have migrated to the reservoir) with the plunger pump filling this receptacle upon closure of the valve. Preferably, a mechanical valve is employed whose valve member forms a plunger obstructing a passage leading from the receptacle and engaging a lever fulcrumed on a base plate upon which the valves, the syringe, the eccentric, and the gel column are mounted. Advantageously, the receptacle is provided with a tapered-joint sidearm adapted to form a bridge providing the other terminal for the electrophoresis current source. The bridge may thus consist of an L-shaped tube containing a circulated-electrolyte buffer and separated at a tapered male joint from the elution liquid in the receptacle by a semipermeable membrane.

Still another feature of the present invention resides in the provision of a unit for the electrophoretic separation of specimens using a gel column which has the essential components compactly housed and conveniently arranged so as to require a minimum of space and assembly. Thus, I provide an upright support plate having a clamp adapted to support the gel column whose elution cup for the lower end of the column is mounted upon the plunger-type valve affixed to this plate whereby the position of the lower end of the column is mounted upon the plunger-of the elution cup can be adjusted.

In addition, the plate forms a support for a cam-follower lever coupled with the valve plunger and engaging a timing cam which forms the eccentric drive for a syringe-type pump. This pump may comprise a clamp assembly for the syringe and an eccentric bracket of T-shaped configuration with an elongated slot extending transversely of the syringe axis, i.e. generally horizontally. The slot receives an eccentric pin which is carried by the cam in a radial channel of the latter with means being provided for adjusting the radial distance of the pin from the center of rotation of the cam and thus the eccentricity of the latter. The adjustment means may include circuit means for at least initially bringing the radial slot of the cam and the slot of the syringe-plunger bracket into registry at a position in which the eccentric pin is exposed. Such means may include a switch for automatically locating the pump drive in this position.

Still another feature of this invention resides in the provision of a further switch providing manual control of the cam to allow its slot to be brought into alignment with the syringe whereby the volume-indicating index marks on the latter can be used for accurately setting the volume to be delivered by the syringe pump at each stroke. Moreover, the support plate forms part of a housing containing a time-delay means triggered by the cycle-initiating impulse of a programmer such as the timer of the fraction collector.

In accordance with this latter aspect of the invention, the fraction collector, after a time interval sufficient to effect electrophoretic migration of components of the specimen along the column and upon the positioning of a new collection vessel in alignment with the valve means, initiates an elution-change cycle. The circuitry of the device thus includes a time-delay relay or an electronic delay network whose delay time is sufficient to permit the new collection vessel to be aligned with the valve outlet; the relay then actuates a drive motor for the single-revolution cam via a holding circuit which may be manually bypassed for setting purposes. The circuitry further includes means for temporary disconnecting the electrophoresis power supply from the electrodes and, advantageously, connecting a dummy load across the power supply during the elution-change cycle. Initially, the valve opens to discharge the solution while the plunger of the syringe is withdrawn to aspirate elution solution from a reservoir into the syringe. Continued rotation of the cam closes the valve and drives the plunger of the syringe forwardly to express the elution solution into the cup. Upon conclusion of the change cycle, the holding circuit is open and the power supply reconnected to the electrodes.

The above and other objects, features and advantages of the present invention will become more readily apparent from the following description, reference being made to the accompanying drawing in which:

FIG. 3 is a detail view of the cam assembly of this system;

FIG. 4 is a view along the line IV—IV of FIG. 1;

FIGS. 5 and 6 are diagrams showing portions of the system in different operating positions; and FIG. 7 is a fragmentary view of another system for adjusting the delivery volume of the syringe.

Figure 1:
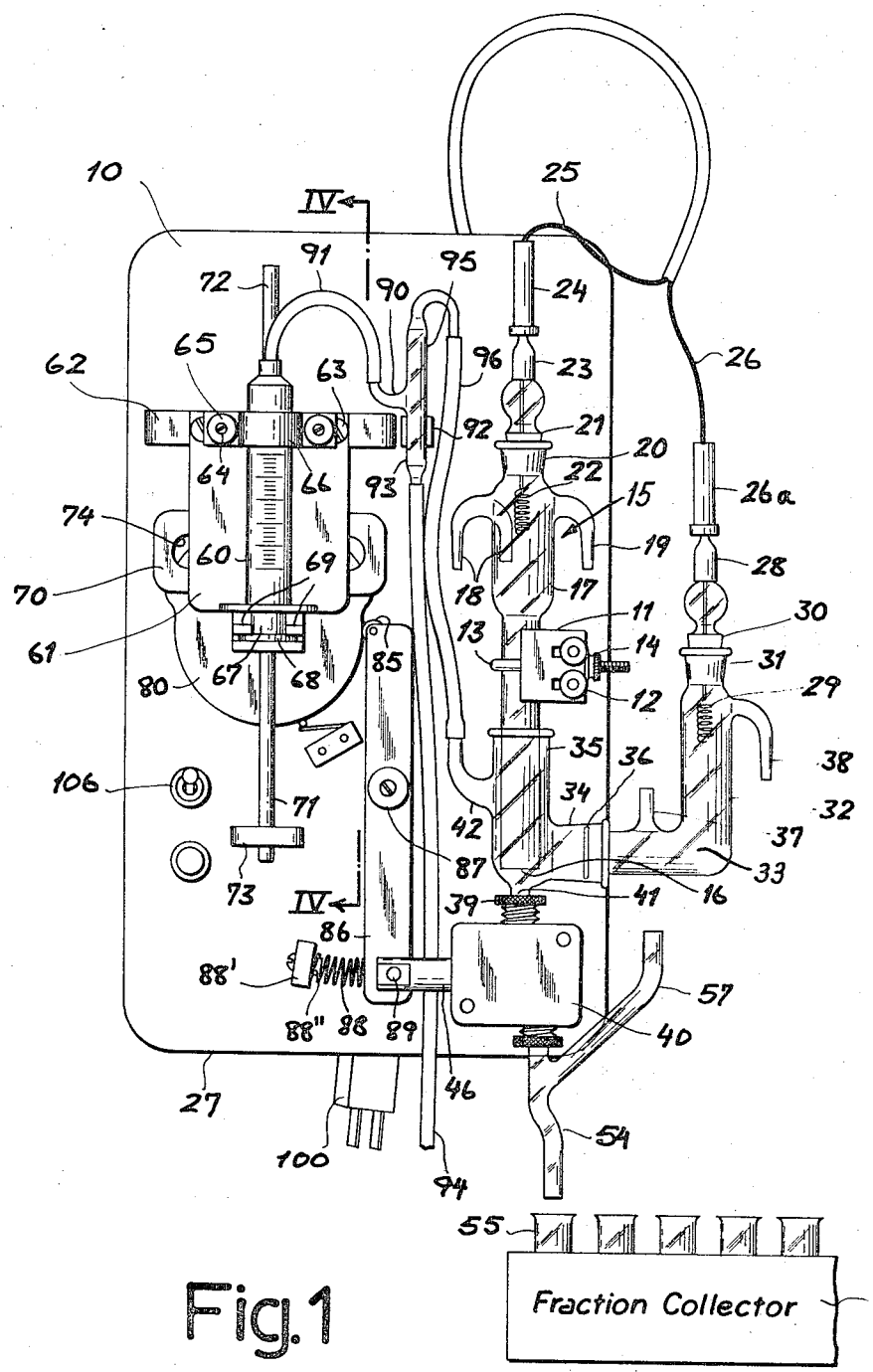
FIG. 1 is an elevational view of a gel-column electrophoresis apparatus according to the present invention.

In FIG. 1, I show a fractional electrophoresis separator which comprises a support plate 10 upon which a clamping block 11 is held by knurled nuts 12, this clamping block receiving a U-bolt 13 tightenable by milled nuts 14 to retain a gel column 15 in place upon the plate 10. The gel column 15, which may receive an electrophoresis gel as described by Jovin et al. in the aforementioned publication, can be provided at its lower end 16 with a web of open-pore high-wet strength paper (e.g. tea-bag paper) to support the gel.

Above the gel within the glass column 15, an electrode-buffer solution is retained in a reservoir 17 formed as an enlargement of the column 15. The buffer solution is introduced into the reservoir 17 via an inlet 18 and is removed from the receptacle via an outlet 19 connected in a buffer-circulating system including a pump and suitable receptacles. Buffer circulation through the reservoir 17 serves to dissipate the heat generated in this region. At the head of the reservoir 17, I provide a ground-glass tapered joint 20 which receives a ground-glass plug 21 through which the spirally coiled platinum electrode wire 22 extends, the wire being attached to a metal cap over which the socket 23 can be slipped. The socket 23 is mounted in an insulated sleeve 24 at one end of a lead 25 which, together with lead 26, form the electrode connections extending into that housing structure 27 provided beneath the support plate 10.

The lead 26 has an insulated sleeve 26a terminating in a socket 28 making conductive contact with the cap of a further spiral electrode 29 in the ground-glass tapered-joint plug 30. The latter is received in a ground-glass tapered socket 31 of a buffer-electrolyte reservoir 32 of L-shaped configuration whose horizontal leg 33 has a ground-glass male taper received within the female member 34 laterally formed on an elution-buffer vessel or cup 35. A semipermeable membrane in the form of a Visking dialyzer membrane (see my earlier application cited above) is mounted across the male joint of leg 33 via an O-ring 36 to prevent mixing of the elution buffer with the electrode buffer in reservoir 32. In place of the semipermeable membrane, it is possible to employ a sintered-glass microporous plate as described and claimed in my copending application or a column of polyacrylamide gel in the leg 33. Circulation of the electrolyte buffer in chamber 32 is effected via a conventional pump system (not shown) designed to feed the electrolyte buffer into reservoir 32 via an inlet 37 and to remove it from an outlet 38.

The elution buffer cup 35 has an outlet clamped by a nut 39 in a plunger-type valve 40 as illustrated diagrammatically in FIGS. 5 and 6. By loosening nuts 14 and the U-bolt clamp 13, the position of the mouth 16 of the gel column 15 with respect to the outlet 41 of the elution buffer cup 35 can be adjusted conveniently. Above the mouth 16, the elution buffer cup 35 is provided with a sidearm 42 through which the elution buffer is supplied to the cup by a reciprocating pump here constituted as a syringe as will be described in greater detail hereinafter. The valve 40 (see FIGS. 5 and 6) comprises a valve body 43 formed with a horizontal bore 44 into which a vertical passage 45 opens and which slidably receives the valve member 46. A packing nut 47 is threaded into the bore 45 and compresses an annular seal 48 against the outlet stem 41 of the elution cup 35. A further bore 49 threadedly receives the packing nut 50 which compresses an annular seal 51 against one arm 52 of a glass-tube "Y" 53 whose discharge spout 54 is adapted to register with individual receptacles 55 of a fraction collector 56 shown in diagrammatic form. The term "fraction collector" is here used to indicate any apparatus in which individual receptacles are successively positioned beneath the outlet 54 to receive individual elution fractions and a number of such devices are available on the market. In general, these devices include a carriage, turntable or other moving structure provided with pockets for the individual receptacles (e.g. test tubes), the turntable being stepped with a predetermined interval and cadence by a timer built into the fraction collector. A further arm 57 of the glass "Y" 53 may be used to ensure complete draining of the outlet upon closure of the valve member 46 and for the addition of further quantities of liquid to the test tubes as required.

According to an important aspect of this invention, the means for intermittantly replacing the elution buffer in the cup 35 comprises a syringe-type pump whose syringe body 60 is clamped onto a plate 61 cantilevered on a bar 62 secured to mounting plate 10. The plate 61 is affixed to the bar 62 by screws as shown at 63 and, in turn, is provided with upstanding pins 64 onto which the knurled nuts 65 can be threaded to clamp a bracket 66 to the plate 61 and thus retain syringe 60 in place. The plunger 67 of this syringe has its head 68 received within the bifurcation 69 of a T-shaped plate 70 (see also FIGS. 3 and 4) which is rigid with a pair of rods 71 and 72 vertically guided in the bar 62 and a plate 73 vertically spaced apart on the support plate 10. The bars 71 and 72 ensure vertical movement of the T-shaped member 70 in a plane parallel to the plane of plate 10.

Figure 2:
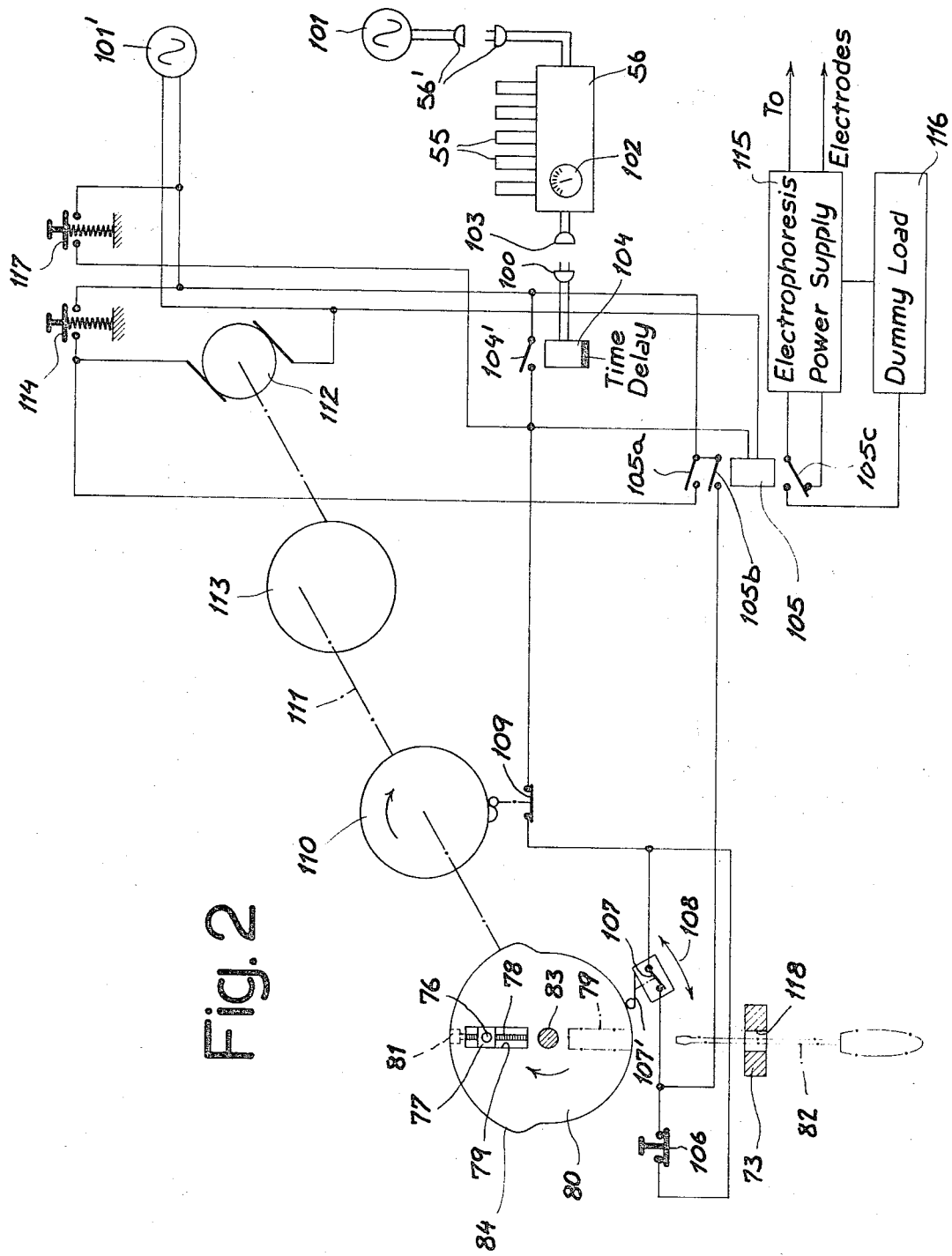
FIG. 2 is a circuit diagram illustrating some aspects of the invention.

The head of the T-shaped member 70 is formed with a horizontal slot 74 (FIGS. 1 and 3) in which a cylindrical bearing sleeve 75 is slidably and rotatably guided. The sleeve 75 forms an eccentric pin about an Allen screw 76 threaded into a guide block 77 (FIG. 2). The block 77 threadedly receives a lead screw 78 and is shiftable along a radial channel 79 in a cam 80 co-ordinating the operation of valve 40 with the syringe 60. The screw 78 has a head 81 engageable by a screw driver 82 along the periphery of the cam 80 at least in one position of the latter (as described in greater detail below) to permit adjustment of the radial distance between the block 77 and the center of rotation 83 of cam 80. The eccentricity of this pin, of course, determines the throw of member 70 and the stroke of the syringe plunger 67, thereby establishing the volume of elution buffer supplied to the cup 35.

The syringe 60 is connected by flexible tube 91 with a two-way valve 90 mounted in a clamp 92 on the plate 10. The intake side 93 of this valve is connected by flexible tubing 94 to an elution-buffer supply reservoir while the discharge side 95 of valve 90 is connected by the flexible tube 96 to the previously described sidearm 42 of the elution buffer cup 35.

In FIGS. 5 and 6, the valve 90 is illustrated in alternative operating modes. At the intake side 93, the valve is formed with a seat 93′ engageable by a check valve member 93″ between the buffer reservoir and a sidearm 97 connecting the valve with the syringe 60 by flexible tube 91. On the other side of this sidearm, valve seat 95′ is engageable by the check-valve member 95″. From FIG. 5, it is apparent that during the downstroke of the syringe plunger 67, the elution buffer is drawn upwardly past the valve seat 93′ and displaces check-valve member 93″ as the elution solution passes into the syringe. During the up-stroke of the plunger 67, however, the elution buffer within the syringe 60 is discharged via line 91 past the seat 95′ and displaces the check-valve member 95″ while proceeding into cup 35 to replenish the latter.

To synchronize the operation of the valve 40 with the syringe 60, I provide unirotational cam 80 with a peripheral contour 84 which co-operates with a cam-follower roller 85 at one end of a lever 86 pivotally connected at 87 to the plate 10 and swingable in a plane parallel to this plate. At its other end, the lever 86 is engaged by a compression spring 88 which reacts against a spring seat 88′. The latter has a centering screw 88″ preventing escape of the compression spring 88. A pivot 89 connects lever 86 with the member 46 of valve 40.

Referring now to FIG. 2 in which the circuitry of the device is represented in diagrammatic form, it can be seen that the housing below the plate is provided with a plug 100 whereby the system can be connected with the timer of the fraction collector 56. As represented in diagrammatic form in FIG. 2, the fraction collector 56 can be connected at 56′ to a source 101 and is provided with a plurality of test tubes 55 adapted to be positioned in succession beneath the outlet 54. The timer of the fraction collector 56 has a timer adjustment 102 adapted to set the interval between successive advances of the test tube carriage or turntable and to provide an impulse at its outlet jack 103 concurrently with the stepping of the test tube. To ensure sufficient time for the proper positioning of a new collection vessel beneath the outlet 54, the impulse is applied to a time-delay means here shown as a relay 104 whose switch 104′ closes only upon the elapse of a predetermined period on the order of seconds to initiate the elution buffer change. When switch 104′ closes, it closes a circuit between the line source 101′ and the coil 105 of a holding relay to energize this coil and close the sets of front contacts 105a and 105b while reversing the back contacts 105c.

The contacts 105b form a holding path in series with a manually operable toggle switch 106 which is mounted upon the plate 10 (see FIG. 1) and a sensitive switch 107 whose feeler 107′ co-operates with the cam contour 84. As represented by the arrow 108, the switch 107 is shiftable along the path of the cam for adjustability of the timing of opening of this switch as will be apparent hereinafter. The holding network of contacts 105b also includes a switch 109 triggered by a further cam 110 coupled with the shaft 111 of cam 80.

The contacts 105a of relay 105 are connected between the source 101′ and an electric motor 112 which drives shaft 111 via a speed-reducing transmission 113. A manually depressible switch 14 shunts the holding circuit to permit manual advance of the cam for setting of the elution-buffer volume. The relay contacts 105c provide switchover between the electrophoresis power supply 115 and a dummy load when draining of the elution-buffer cup is to be initiated.

In operation, the electrolyte-buffer circulating systems are connected in the usual manner, the electrophoresis power supply is attached and the fraction collector is started. The specimen to be fractionated is placed by a pipet upon the upper face of the gel column below the electrolyte-buffer reservoir 17 and plugs 21 and 30 are inserted. When unusually high electrophoresis currents are employed, the reservoirs 17 and 32, the column 15 and the cup 35 may be water-jacketed as described in my aforementioned copending application. The timer 102 is set to the interval between advances of the test tubes 55 and thus the periods for which the electrophoresis is carried out prior to the commencement of a change cycle. The collection cycles may have intervals of 3 to 20 minutes and are followed by a 30 second drainage and refilling sequence.

After the fraction collector steps the first test tube into place, the circuit is in the position illustrated in FIGS. 1 and 2 and electrophoresis occurs for the predetermined interval, the dummy load 116 being disconnected while the electrodes receive power from the current source 115 via contacts 105c. Upon the elapse of this interval, the fraction collector applies a pulse to the time-delay relay 104 which closes its contacts 104′ momentarily after a delay for a period sufficient to permit the test tube to be replaced beneath the outlet of valve 40. The coil 105 of the holding relay is energized to reverse contacts 105c and thereby cut off the connection between the electrodes and the power supply 115 while applying a dummy load of similar resistance across the power supply to prevent undue surges at the power supply. The dummy load is represented at 116. Concurrently with termination of the current supply across the column 15, switch 105a closes to energize motor 112 and drive the cam 80 in the clockwise direction.

As is illustrated in FIG. 5, rotation of the cam 80 in the clockwise sense brings its contour 84 into engagement with the follower roller 85 of the lever 86 so that this lever is swung in the clockwise sense as well. The valve member 46 is drawn to the left, thereby establishing communication between the outlet 41 of the elution buffer cup 35 and the drainage tube 54 to discharge all of the elution buffer within the cup into the newly positioned collection vessel 55 below the outlet 54. During the discharge of the elution-buffer, continued rotation of the cam 80 shifts the T-shaped member 70 downward (arrow A) so that elution buffer is drawn from its reservoir past the intake side 93 of valve 90 into the syringe 60 as illustrated in FIG. 5 and previously described.

Upon complete filling of the syringe (FIG. 6), the follower 85 of lever 86 is released by the cam contour 84 and the lever 86 is then swung by the spring 88 in the counterclockwise sense to drive the valve member 46 to the right and thereby close the outlet 41 from the buffer cup 45. The plunger 67 of syringe 60 is driven upwardly (arrow B) to force fresh elution buffer past the discharge side 95 of valve 90 and into the cup 35. At the conclusion of the elution-buffer change cycle, cam 110 opens switch 109 to break the hold circuit to relay coil 105 and de-energize the latter. Contacts 105c reverse again to disconnect the dummy load 116 and reconnect the power supply 115 with the electrodes. At the next stepping of fraction collector 56, this cycle is repeated.

To set the elution-buffer volume repeatedly added to the cup 35, it is merely necessary to adjust the eccentric pin 75. To this end, the interrupter switch 106 is provided. When the normally closed toggle switch 106 is open-circuited during a normal change cycle as initiated, for example, by a momentary operation test switch 117, the cam 80 rotates in the clockwise sense until the control 84 opens switch 107 in a position in which the radial slot 79 is aligned with the horizontal slot 74 and the Allen screw 76 is exposed at the right-hand side of the syringe as represented in FIG. 3; in this position, the Allen screw is loosened, further rotation of the cam 80 is effected by depression of switch 114 which is held closed until the slot 79 is brought into alignment with the rods 71 and 72 and with a bore 118 in the plate 73 beneath the rod 71 (see FIG. 2) in which the dot-dash position of slot 79 represents the appropriate alignment of the latter when switch 114 is released. The screwdriver 82 can now be inserted through the bore 118 to turn the lead screw 78 and shift the pin 75 and the T-shaped member 70 to which the plunger 67 is connected until the plunger is at an index mark of the syringe corresponding to, say, 5 cc. in the case of a 10 cc. capacity syringe. In this position of the plunger, the stroke of the piston upon rotation of the cam is at a minimum. The pin 75 can then be backed away to any desired volume, it being understood that the distance through which the pin 75 is now moved is half the plunger stroke. When the desired stroke has been set using the index markings on the syringe, the screwdriver 82 is withdrawn and switch 114 actuated to swing the Allen screw 76 to an exposed position (see FIG. 6) in which the screw is tightened to clamp the block 77 to the load screw 81 and prevent any change in the eccentricity. Switch 114 is then held closed until switch 107 is disengaged by the contour 84 whereupon switch 117 can be momentarily tripped to permit the cam cycle to continue until cam 110, by open-circuiting switch 109, terminates the process in the starting position.

In FIG. 7, I show a modified system for operating the syringe 160 from the motor 112 which may be used in place of the syringe-plunger drive illustrated in FIGS. 1, 3 and 4. The motor 112 (FIG. 2) beneath the support plate 10 carries a cam 180 whose outer contours 184 operate the cam follower lever 186 as previously described. In this embodiment, however, the T-shaped traveller 70 is replaced by a rod 171b which is axially shiftable parallel to the syringe 160 and its plunger 176 in a guide 73 (not shown in FIG. 7) and the guide block 162 which is mounted upon the plate 10 and corresponds to the block 62 previously described. The rod 171b carries a pin 175 which forms, in this embodiment, an eccentric which is slidably received in a captive-cam groove 174. Thus the pin 175 and its block 175a are shiftable linearly as represented by arrow 175b with a stroke length determined by the throw of the cam groove 174. In this embodiment, I provide a lost-motion coupling between the rod 171b and the plunger 167 of the syringe 160 which rests upon the plate 161 and is clamped in place at 166 in the manner previously described. Screws 163 retain the plate 161 upon the block 162. The lost-motion linkage here comprises an actuating member 175c which is shiftable relatively to the rod 171b as represented by an arrow 175d but can be clamped to the latter by a set screw 175e. The member 175c has a further bore 175f receiving a rod 171a with clearance. The rod 171a is parallel to rod 171b and is shiftable in the blocks 162 and 73, the rod 171a carrying a plunger-engaging body 169 which may be bifurcated as shown at 69 for the traveller of FIGS. 1, 3 and 4. The head 168 of the plungers 167 is removably mounted without play in the body 169 which is fixed on its rod 171a by a set screw 169a. A further body 169b is carried by rod 171a and is locked thereto by the set screw 169c. The body 169b is, however, slidable along the rod 171b and is formed with a bore 169d through which the latter rod passes. Between the members 169 and 169b, the member 175c defines a lost motion L which represents the stroke of the cam 180 through which the rod 171b must move before the plunger 167 is entrained. Thus, assuming the cam is about to commence its forward stroke of plunger 167, the plunger is not displaced until member 175c has moved through the distance L. There, however, the plunger is entrained for a total stroke $s=S-L$, where S is the substantially constant stroke of the cam groove 174. By adjusting the play L (by loosening screws 169a, 175e and 169c and retightening them after repositioning of the members 169, 175c and 169b) it is possible to establish the actual stroke s of the plunger at any value between S and zero. This adjustment mechanism is relatively simple and does not require precise positioning of the cam prior to setting.

The invention described and illustrated is believed to admit of many modifications within the ability of persons skilled in the art, all such modifications being considered within the spirit and scope of the appended claims.

I claim:

1. A fractional electrophoresis apparatus comprising an upright electrophoresis gel column provided with an elution receptacle at its lower end; pump means for intermittently feeding quantities of a fresh elution solution to said receptacle; valve means at said receptacle for intermittently draining elution solution from said receptacle prior to the addition of fresh elution solution thereto; a mechanical coupling between said valve means and said pump means for opening said valve means synchronously with intermittent displacement of said valve means whereby said valve means passes a quantity of said elution solution equivalent to that displaced by said pump means; and means including electrolyte-buffer receptacles for maintaining electrical connection between electrolyte buffers and opposite ends of said column without mixture of said electrolyte buffers with said elution solution.

2. An apparatus as defined in claim 1 wherein said pump means comprises a plunger-type reciprocating pump, intake and discharge check-valve means connected with said pump and respectively interposed between a reservoir for said elution solution and said pump and between said pump and said elution receptacle for alternately supplying said solution to said pump and conducting said solution from said pump to said elution receptacle, and eccentric drive means connected with said pump for operating same.

3. An apparatus as defined in claim 1 wherein said valve means includes a valve member shiftable between a valve-opening and a valve-closing position, cam means connected with said pump means for synchronizing the operation of said pump means with that of said valve means and a cam follower engaging said cam means and coupled with said member for shifting same between said positions.

4. An apparatus as defined in claim 2 wherein said eccentric drive means is provided with adjusting means for varying the throw of said eccentric drive means and the stroke of said pump for adjusting the volume of said solution delivered to said elution receptacle.

5. An apparatus as defined in claim 2 wherein said eccentric drive means includes an adjustable lost-motion means connected with said pump for adjusting the volume of said solution delivered thereby to said elution receptacle.

6. An apparatus as efined in claim 4 wherein said pump is a syringe having a plunger, said eccentric-drive means including a disk having an eccentric, and a member provided with a slot slidably receiving said eccentric and engaging said plunger.

7. An apparatus as defined in claim 6, further comprising a support plate carrying said column, said valve means, said syringe and said drive means, guide means defining a linear path for said member parallel to the axis of said syringe, said disk being provided with a radial channel receiving said eccentric, and with means for adjusting the position of said eccentric along said channel.

8. An apparatus as defined in claim 7, further comprising manually operable control means for rotating said disk to dispose said eccentric at a predetermined location along the path thereof for facilitating adjustment of said eccentric along said channel.

9. An apparatus as defined in claim 6 wherein said valve means has a movable valve member, said disk being provided with a cam formation, said apparatus further comprising cam-follower means engaging said disk and coupled with said valve member for shifting same.

10. An apparatus as defined in claim 9 wherein said cam follower means includes a lever upon said member, and spring means bearing upon said lever for urging said lever into contact with said disk while urging said valve member into a valve-closing position.

11. A fractional electrophoresis apparatus comprising an upright electrophoresis gel column provided with an elution receptacle at its lower end; pump means for intermittently feeding quantities of a fresh elution solution to said receptacle; valve means at said receptacle mechanically coupled with said pump means for intermittently draining elution solution from said receptacle prior to the addition of fresh elution solution thereto; housing means including a vertical support plate carrying said column, said pump means and said valve means, said elution receptacle being upwardly open and being provided laterally with a ground-glass joint; and electrolyte-buffer reservoir having a complementary ground-glass joint receivable in the joint of said elution receptacle from above and provided at its upper end with an electrolyte-buffer chamber; clamp means on said plate for releasably retaining said column thereon, said column having an electrolyte-buffer chamber at its upper end; means at each of said electrolyte-buffer chambers for circulating an eletrolyte buffer therethrough without mixture with said elution solution; and electrode means at each of said electrolyte-buffer chambers for immersing a respective electrode in the electrolyte buffer therein.

12. An apparatus as defined in claim 11 wherein said pump means includes a plunger-type syringe, mounting means on said plate for retaining the body of said plunger-type syringe thereon, a cam disk mounted on said plate and rotatable to effect a change in the elution solution within said elution receptacle, said cam being provided with an eccentric pin, a plunger-shifting member engaging the plunger of the syringe body and provided with a slot transversely of said body for slidably receiving said pin, guide means constraining said member to movement parallel to the axis of said body, means for adjusting the throw of said eccentric pin, a first check valve connected with said body for admitting an elution solution thereto during an intake stroke of said plunger, and second check valve between said syringe body and said elution receptacle for delivering elution solution to the latter during a discharge stroke of said plunger; said valve means includes a valve member shiftable to control the draining of said elution receptacle, and a lever fulcrumed on said plate and bearing upon said cam disk while being coupled with said valve member for controlling the latter in response to rotation of said cam disk; and said apparatus further comprises circuit means triggerable by a fraction collector adapted to position successive collection vessels in alignment with the valve means controlled by said valve member, said circuit means including a motor mounted in said housing and drivingly connected with said cam, time-delay means connected with said motor for delaying the commencement of the operation of said motor for a period sufficient to permit the position of a collection vessel by said fractin collector, and switch means connectable between an electrophoresis power supply and said electrodes for disconnecting said power supply from said electrodes upon the commencement of operation of said motor.

References Cited
UNITED STATES PATENTS 3,305,471  2/1967  Von Münchhausen et al. 204—299
3,346,479  10/1967  Natelson _____ 204—301

OTHER REFERENCES

Perry et al., "Perry's Chemical Engineer's Handbook," 4th ed., McGraw-Hill, 1963.

JOHN H. MACK, Primary Examiner

A. C. PRESCOTT, Assistant Examiner

U.S. Cl. X.R.

204—180

5461

UNITED STATES PATENT OFFICE
CERTIFICATE OF CORRECTION

Patent No. 3,553,097　　　　　　　　　　Dated 16 February 1971

Inventor(s) Joseph BUCHLER

It is certified that error appears in the above-identified patent and that said Letters Patent are hereby corrected as shown below:

Column 9, line 27 (claim 11, line 12) read -- an -- for "and".

Signed and sealed this 11th day of May 1971.

(SEAL)
Attest:

EDWARD M. FLETCHER, JR.　　　　　　　　WILLIAM E. SCHUYLER, JR.
Attesting Officer　　　　　　　　　　　Commissioner of Patents